United States Patent [19]

Estelle et al.

[11] Patent Number: 5,572,369
[45] Date of Patent: Nov. 5, 1996

[54] TRIPLET-TYPE LENS FOR USE IN A COMPACT PHOTOGRAPHIC CAMERA

[75] Inventors: Lee R. Estelle, Rochester; William T. Goosey, Jr., Fairport, both of N.Y.

[73] Assignee: Eastman Kodak Company, Rochester, N.Y.

[21] Appl. No.: 84,380

[22] Filed: Jun. 29, 1993

[51] Int. Cl.$^6$ ........................................... G02B 9/14
[52] U.S. Cl. .......................... 359/785; 359/788; 359/790
[58] Field of Search .................... 359/785, 788, 359/790

[56] References Cited

U.S. PATENT DOCUMENTS

| | | | |
|---|---|---|---|
| 3,649,103 | 3/1972 | Kamimura | 359/790 |
| 3,784,287 | 1/1974 | Grey | 350/226 |
| 3,895,857 | 7/1975 | Imai | 350/227 |
| 3,910,685 | 10/1975 | DeJager | 350/226 |
| 3,953,112 | 4/1976 | Imai | 350/227 |
| 3,967,884 | 7/1976 | DeJager | 350/226 |
| 4,192,579 | 3/1980 | Hyakumura | 350/227 |
| 4,281,908 | 8/1981 | Yamaguchi | 350/476 |
| 4,415,241 | 11/1983 | Shinohara | 350/476 |
| 4,487,484 | 12/1984 | Mihara | 350/449 |
| 4,606,615 | 8/1986 | Wakamiya | 350/476 |
| 4,620,775 | 11/1986 | Fujioka | 350/449 |
| 4,676,607 | 6/1987 | Wakamiya | 350/476 |
| 4,733,951 | 3/1988 | Pareigat | 359/691 |
| 4,836,665 | 6/1989 | Wakamiya | 350/476 |
| 4,886,342 | 12/1989 | Kudo et al. | 350/252 |
| 4,892,398 | 1/1990 | Kudo et al. | 350/475 |
| 5,155,632 | 10/1992 | Hirano | 359/790 |
| 5,175,652 | 12/1992 | Shimizu | 359/793 |

FOREIGN PATENT DOCUMENTS

| | | |
|---|---|---|
| 60-177313 | 9/1985 | Japan . |
| 4-153612 | 5/1992 | Japan . |

Primary Examiner—Georgia Y. Epps
Assistant Examiner—Jacqueline M. Steady
Attorney, Agent, or Firm—Svetlana Z. Short

[57] ABSTRACT

A compact objective lens system with a diaphragm arranged in front of or preferably behind the lens system and suitable for use in compact photographic cameras. The objective lens comprises a plurality of components arranged in a triplet-type configuration that are capable of covering at least a 55 degree field of view and utilizes the locations of aperture stop, the lens bendings, and the size of lens elements, clear apertures of the lens element surfaces to enhance the lens system performance and to eliminate stray light problems.

45 Claims, 4 Drawing Sheets

TRIPLET-TYPE LENS FOR USE IN A COMPACT PHOTOGRAPHIC CAMERA

CROSS-REFERENCE TO RELATED APPLICATION(S)

This application is related to U.S. patent application Ser. No. 08/084,387, filed Jun. 29, 1993, and entitled A COMPACT OBJECTIVE LENS SYSTEM, filed in the names of Lee R. Estelle and William T. Goosey, Jr.

BACKGROUND OF THE INVENTION

1. Field of the Invention

The present invention relates to a lens system suitable for use as an objective or taking lens for very compact photographic cameras whose diaphragm is arranged in front of the first lens element or behind the last lens element, the lens system providing a field coverage of at least 55 degrees and preferably 60 degrees or higher.

2. Description of the Prior Art

With the increasing demand for manufacturing smaller, more compact photographic cameras at a lower cost, there is an increased need for use of smaller and less costly lens systems. Triplet or a Tessar-type lens systems are good candidates for such use because these systems have relatively few lens elements.

Triplet-type or triplet derivatives such as Tessar-type lens systems or modified Tessar-type lens systems have been used in photographic apparatus for many years. Moreover, the objectives having a triplet type lens system with the diaphragm arranged either in front of the first lens element or behind the last lens element are also well known, and such lens systems are disclosed in U.S. Pat. No. 3,910,685, U.S. Pat. No. 4,886,342, U.S. Pat. No. 4,892,398, U.S. Pat. No. 4,836,665, U.S. Pat. No. 4,676,607, U.S. Pat. No. 3,967,884, U.S. Pat. No. 3,895,857, and U.S. Pat. No. 3,784,287. Such objectives have an advantage of being compact, having relatively few lens elements and eliminating the costs of "split" barrels.

However, many of these lens systems are assembled in their optical barrels with spacers such as spacer rings or shims placed between the optical components. This is disadvantageous because the spacers may cause tolerance build-up on thicknesses as well as tolerance build-ups due to spacer wedge. In addition, there is an increased cost due to extra parts.

The need for the spacers or shims can be eliminated as shown in U.S. Pat. No. 4,676,607, but if the edge contact is done inappropriately, the lens system may either become unnecessarily bulky, or may introduce unwanted stray light problems.

Finally, the inventors have found that if the sun's azimuth angle is 55 to 75 degrees, some of the sun light may propagate through a typical triplet type lens system causing glare in the film plane and causing some of the pictures taken by the end user to be of unacceptable image quality.

Thus, as there is a growing demand for more compact photographic cameras and correspondingly, there exists a need to further improve and simplify the lens system for use in such cameras, and to lower the cost of making such lens systems by making them less expensive to assemble while eliminating or minimizing stray light or glare problems and while maintaining or improving lens system imaging quality.

SUMMARY OF THE INVENTION

The object of the present invention is to produce a photographic lens device which includes a lens system which is uniquely suited for use in a compact photographic camera and which is relatively inexpensive to produce and to assemble.

Another object of the present invention is to provide a compact photographic camera with a lens system that eliminates stray light problems.

These and other objects of the invention have been attained by a lens system comprising from the object side: a first positive meniscus lens component having a lens surface convex to the object side; a second bi-concave lens component; a third bi-convex lens component; and a diaphragm arranged behind the lens system, the diaphragm capable of acting as a lens baffle to eliminate unwanted light when the lens system is operating in a wide open mode, while one of lens surfaces is acting as an aperture stop, the diaphragm is acting as an aperture stop when the lens system is operated at slower F-numbers, wherein the lens system fulfills the following conditions:

$$N_3 - N_1 \leq 0.1$$

$$\frac{N_1}{N_2} \geq 0.9$$

$$0.25f < \Sigma d < 0.35f$$

where $f$ is the composite focal length of the lens system; $\Sigma d$ is the distance from the vertex of the foremost lens surface to the vertex of the last lens surface; $N_1$ represents the refractive index of a positive lens element forming the first lens component; $N_2$ represents the refractive index of a negative lens element forming the second lens component; and $N_3$ represents the refractive index of a positive lens element forming the third lens component.

According to another aspect of the present invention, a lens system comprises: a positive first outer lens component; a negative middle power lens component airspaced from the positive first lens component; a positive power second outer lens component, the second outer lens component being airspaced from the second negative lens component; the diaphragm located on the outer side of one of said outer lens components, the diaphragm capable of acting as a lens baffle to eliminate unwanted light when the lens system is operating in a wide open mode, while one of lens surfaces is acting as an aperture stop, the diaphragm is acting as an aperture stop when the lens system is operated at slower F-numbers; and wherein the airspaces between said components are so arranged that there exists an edge contact between the lens components at less than 3 mm and preferably less than 2 mm beyond clear aperture.

According to yet another aspect of the present invention, a compact lens system for use in a compact photographic camera comprises: a plurality of optical elements spaced in a close proximity to one another, the plurality of lens elements having sufficient powers and spacings to enable said lens system to cover a field of view of at least 55 degrees, said plurality of lens elements including at least one positive lens element and one negative lens element wherein the airspace between said positive lens element and said negative lens element is smaller than the thickness of said positive lens element; a diaphragm arranged behind the rear-most lens element of the lens system, the diaphragm is capable of acting as a lens baffle to eliminate unwanted light when the lens system is operating in a wide open mode while one of lens surfaces is acting as an aperture stop, said diaphragm is acting as an aperture stop when the lens system is operated at slower F-numbers; and the lens system in order to be suitable for use in a compact camera satisfies the following parameters:

$$20 \leq f \leq 30$$

$$5 \leq BF \leq 24.85$$

$$3 \leq f/No. \leq 16,$$

where $f$ is the focal length of the lens system, BF is the back focus of the lens system and $f$/No. is the F-number of the lens system.

According to yet another aspect of the present invention, a compact lens system comprising from an object side: a first positive power meniscus lens component having a foremost lens surface convex to the object side; a second bi-concave lens component; a third bi-convex lens component; and a diaphragm arranged behind the rearmost lens element of the lens system, wherein the lens system fulfills the following conditions:

$$20 \leq f \leq 30$$

$$5 \leq BF \leq 24.85$$

$$3 \leq f/No. \leq 16,$$

said lens components having sufficient surface radii of curvature to provide the proper bending of said components to control the propagation of unwanted overhead light so that said unwanted light rays propagating through the lens system are bent away from propagating toward the opening of the diaphragm.

DETAILED DESCRIPTION OF THE PREFERRED EMBODIMENT

Figure 1:
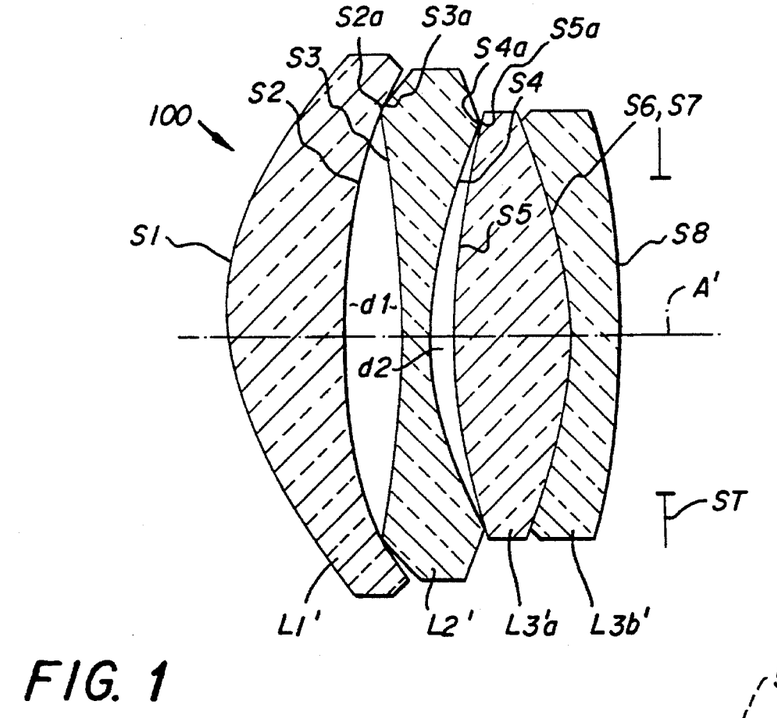
FIG. 1 is a simplified cross-sectional view of a lens system corresponding to a first embodiment of the invention.
Figure 3:
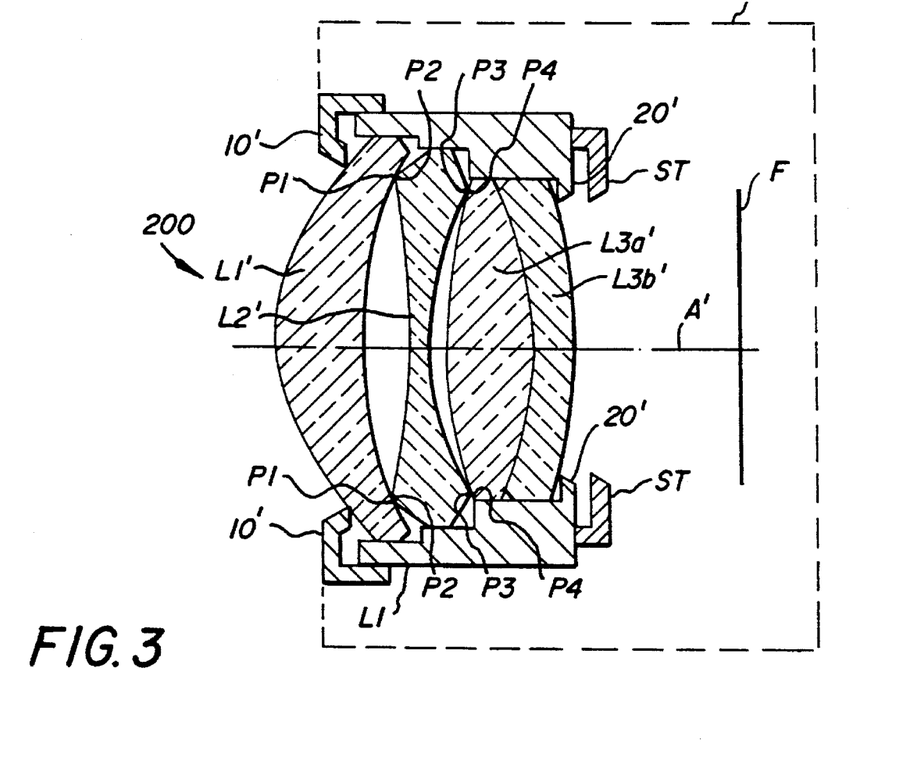
FIGS. 3 and 4 are cross-sectional views of a photographic device showing different mounting embodiments of a mounted objective lens system constructed in accordance with this invention.
Figure 4:
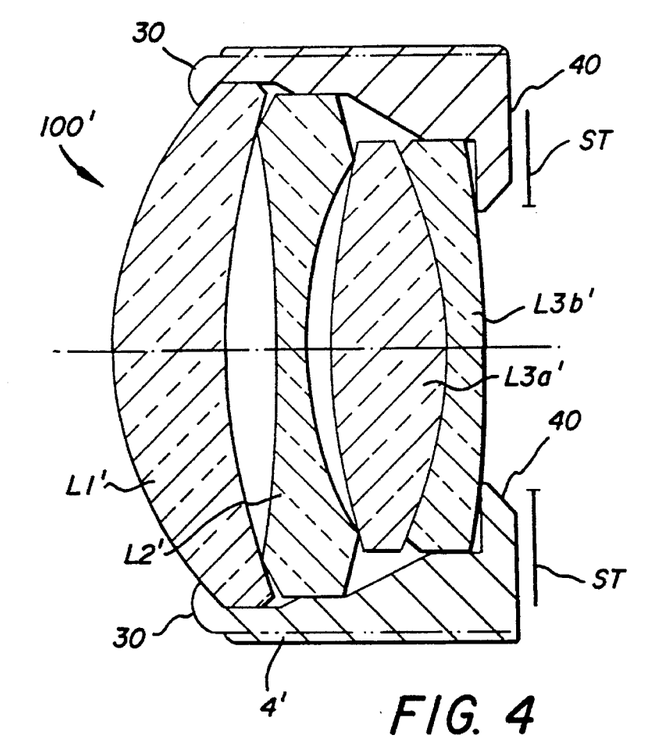

Referring to FIGS. 1, 3 and 4, a photographic device, such as a photographic camera 50', includes a barrel 4 and a three-component lens system 100, 100' retained on the lens barrel 4, 4' respectively and including, in order from an object side, a first, second, third and fourth lens elements L1', L2', L3a' and L3b', respectively, in appropriately spaced axial alignment and forming a taking lens system for focusing light onto a photographic film F located at the focal plane of the camera. An aperture stop ST is located behind the rear lens element L3b'. The particular lens mounts 4, 4' are shown (FIGS. 3 and 4) for illustrative purposes only and these are but some types of mounts which may be used with the lens system disclosed. Since the lens system is primarily intended for use in connection with very compact photographic cameras which are fabricated on a high volume production basis, it is preferred that the lens mounts be compact and also be constructed so that its manufacture is adapted to the assembly of the lens components therein for the mass production techniques. In this particular embodiment and starting at an object side, the first lens component of lens systems 100, 100' is positive and is in the form of a single lens element L1' which has a meniscus shape and has a convex first surface S1 and a concave second surface S2. The second lens component is in the form of a bi-concave lens element having a front surface S3 and a rear surface S4. A third lens component is in the form of a third lens element L3a' which is bi-convex and has a front surface S5 and a rear surface S6 and fourth lens element L3b' which is a negative meniscus lens element having its concave surface S7 adjacent to the rear surface S6 of the third lens element L3a' and its convex surface S8 facing the image side. Because the lens system elements make up three lens components arranged in a positive-negative-positive configuration, the lens system constitutes a triplet derivative. The focal lengths of the first, second and third lens components are 19.49, −9.31 and 11.53 respectively. The absolute value of the ratio of the focal length of the middle component to the total lens system focal length is 0.364. It is important that the lens system according to this invention is capable of covering at least a 55 degree field of view and preferably a field of view of 60 degrees or more and most preferably, a field of 65 degrees or greater while satisfying the requirements for the focal range and the $f$/No. specified below. In particular, the lens system of this embodiment is capable of maintaining an excellent performance over a 67 degree field of view. These requirements are especially advantageous for design of very compact camera lenses. The lens system satisfies the following conditions:

$$N_3 - N_1 \leq 0.1;$$

$$\frac{N_1}{N_2} \geq 0.9;$$

and more preferably $0.9 < N_2/N_1 < 1.0$;

$$0.22f < \Sigma d < 0.38f$$

where $f$ is the composite focal length of the lens system; $\Sigma d$ is the distance from the vertex of the foremost lens surface to the vertex of the last lens surface; $N_1$ represents the refractive index of a positive lens element forming the first lens component; $N_2$ represents the refractive index of a negative lens element forming the second lens component; and $N_3$ represents the refractive index of a positive lens element forming the third lens component.

The significance of the above-mentioned conditions is as follows: It is advantageous to have high index glasses in the positive lens elements, because it helps to keep the Petzval sum low. Also, with the higher index of refraction, the lens element may be made with weaker radii of curvature, thus, the lens system can be made more compact. In addition, in order to correct the Petzval sum, it is advantageous to have the index $N_2$ of the negative lens element as low as possible. However, typically in flint glasses, the lower the index of refraction is, the higher the V number; and, in order to correct color aberrations, we need a low V number. Thus, the first two equations help us balance the Petzval sum and the color correction in the lens system. The last condition helps to keep the lens compact and is also a condition for well-corrected coma aberration for a wide angle system as ours. The performance of the lens systems 100, 100' of the first embodiment is illustrated in FIGS. 2a–2d.

Figure 2A:
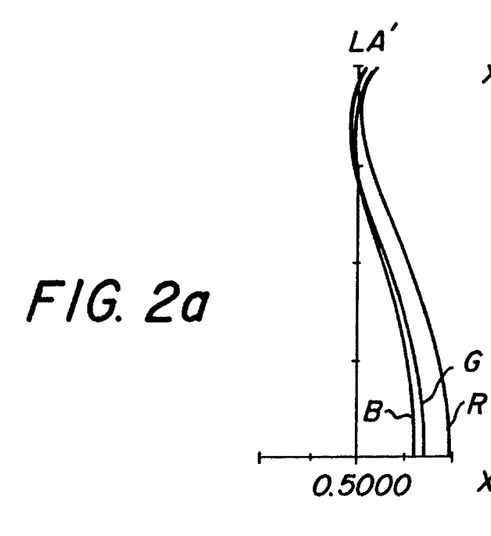
FIGS. 2a–2d represent the aberration curves of the lens system corresponding to the first embodiment.

FIG. 2a is the graph of longitudinal spherical aberration (in mm) with respect to aperture is in three wavelengths. The graph shows well corrected spherical aberration and the axial color is corrected at approximately the 0.9 aperture.

Figure 2B:
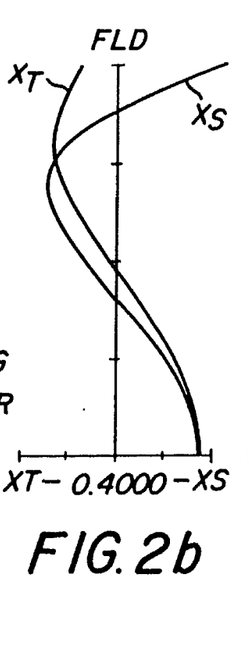

FIG. 2b is a graph of the tangential and sagittal codding-ton field curvature (in mm). It can be seen that there is a node beyond the 0.6 field and the astigmatism is well balanced.

Figure 2C:
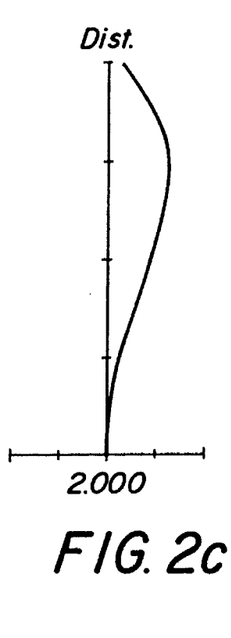

FIG. 2c is a graph that plots the percent distortion with respect to relative image height. The distortion is less than approximately 0.5% at any point in the field.

Figure 2D:
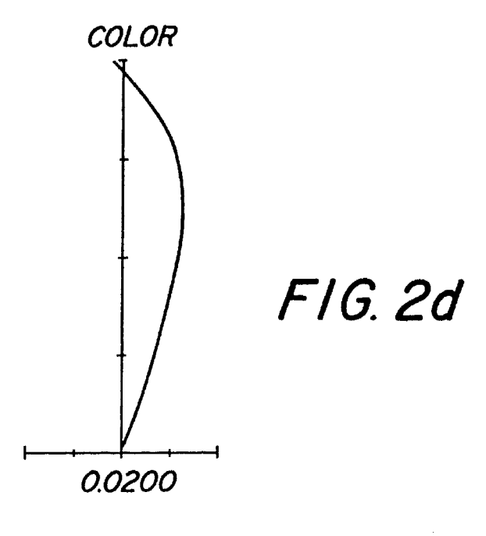

FIG. 2d shows a plot of lateral color (in mm) as a function of relative field. It shows that the lateral color is well balanced and does not vary by more than 5 microns through most of the field.

Although in principal the lens elements can be made of plastic, the lens elements of this embodiment are all made from glass. This eliminates some of the distortion problems referred to in U.S. Pat. No. 4,886,342. The lens elements powers, shapes and the airspaces between the lens elements of lens systems 100, 100' are arranged so that there exists an edge or other contact between the lens elements at less than $\Delta=3$ mm and preferably at less than $\Delta=2$ mm beyond the clear aperture CA. (See FIG. 5 for illustration of $\Delta$.) The "clear aperture" is basically a minimum size aperture of the lens element that allows all of the desired bundles of light rays to go through the lens system to the image plane. These desired bundles of rays are often determined by other surfaces of the lens system. More precisely, the clear aperture is defined as the necessary minimum size opening on the lens surfaces of the lens system that must satisfy both of the following conditions: a) it must be large enough to satisfy the minimum f/No. required, i.e. wide open condition; and b) it must be large enough to transmit the required amount of light in the corners of the field at the maximum field coverage. If the clear apertures are too small, then there will be unacceptable vignetting; and, if they are too large, poorly corrected light could reach the image plane. Also, if they are too large, the lens system will not be compact as desired and may exhibit stray light problems. The section outside the clear aperture may be masked off or otherwise treated so that light striking outside of the clear aperture would be prevented from propagating through the lens system.

Figure 5:
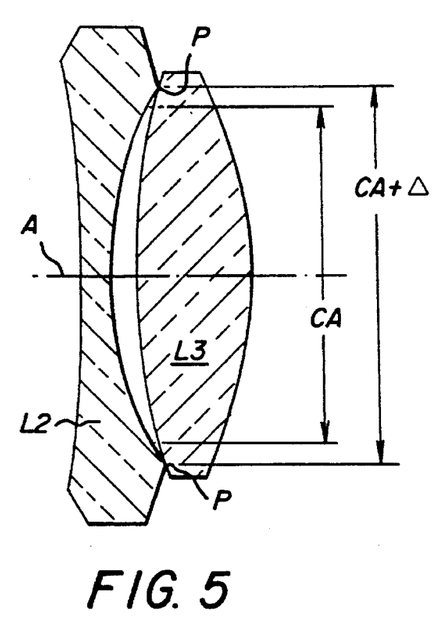
FIG. 5 illustrates the requirements of the edge contact as they apply to the rear surface of a negative lens element.

The mutually contacting surfaces of the lens elements are S2a and S3a; S4a and S5a. These surfaces do not have to be flat, vertical surfaces and they do not need to be cemented together. Surfaces S2a, S3a, S4a and S5a are terminal segments of the optical surfaces S2, S3, S4 and S5, respectively.

Figure 6:
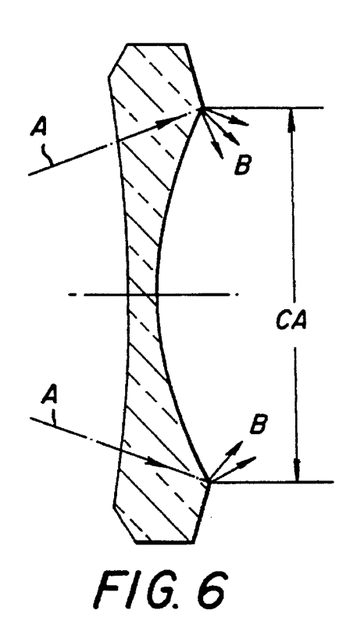
FIG. 6 illustrates formation and propagation of unwanted light if the edge contact points are located at the clear aperture of the surface.

Having an edge contact allows all of the elements to be placed next to each other so they physically touch each other (as in glass-to-glass contact, for example) thus eliminating the costly need for superfluous spacers. This edge contact also eliminates tolerance build-up on the thickness of spacers as well as tolerance build-up on spacer wedge. The manufacturing errors on spacer thickness and spacer wedge angle also cause misalignment of the lens components with respect to each other. This results in the degradation in the performance of the lens system. As stated above, by maintaining the contact between the lens elements, the need for spacers is eliminated which also results in improved performance of the optical system. It is contemplated that a thin layer of adhesive may be placed between the surfaces at the edge contacting regions. As an additional benefit of the edge contact, the lens components tend to self align or self center, thus, eliminating a need for complex alignment procedures. With reference to FIG. 5, the importance of achieving an edge contact at points P on a circle of diameter (CA+$\Delta$), where $\Delta$ is in the range of or less than 3 mm, and more preferably 2 mm or less beyond the clear aperture CA (FIG. 5), that the lens element diameter will be held at a minimum. This requirement tends to minimize the thicknesses of the lens elements and the airspaces between them and thus produces an overall lens system which is very compact and also less expensive to manufacture. On the other hand, it is preferable not to have an edge contact exactly at the clear aperture (i.e.≈0.0 mm beyond the clear apeture) because it was found that digs and chips from the beveling operation cause unwanted sparkling. That is, the digs, scratches, bubbles, and chips, etc. at the resulting edge contact cause the impinging light A to disperse (FIG. 6). The (unwanted) scattered light B then may propagate through the lens system and impinge on the imaging medium such as film. With the stop outside the lens system, the cost of "split" barrels is also eliminated.

It is preferred that the airspace $d_1$ (FIG. 1) between the first and the second elements L1' and L2' be smaller than the first element's thickness $T_1$ and that the airspace $d_2$ between the second lens element L2' and the third lens element L3' be smaller than the thickness $T_3$ of the third lens element L3 facilitates the compactness of the lens system and helps maintain the edge contact between the lens elements. It is preferable that the following relationship be maintained, $T_1 \geq 2d_1$ and $T_3 \geq 2d_2$ and more preferably that $T_1 \geq 2d_1$ and $T_3 \geq 3d_2$. In this first embodiment, $$\frac{T_1}{d_1} = 2.2 \text{ and } \frac{T_3}{d_2} = 4.4.$$

In addition, in order to facilitate lens system compactness, one may specify that at least one airspace between the positive lens element and the second or middle lens element be smaller than the thickness of said second lens element. It should be also noted, the requirements that $$0.275 \leq \frac{|f_2|}{f} \leq 0.375$$

and that $$1.5 \leq \frac{f_1}{f_3}$$

help to maintain an aberration balance while keeping the lens system very compact.

The lens system 100 has a diaphragm or stop ST in position most adjacent to the rear surface S8 of the fourth or rear-most lens element L3b'. The f/No. of the lens system may be determined by the opening in the diaphragm ST. As the opening is reduced the f/No. increases. By placing the aperture stop ST (or diaphragm) at the lo rear of the lens system, the lens system is protected from dust and dirt. Placement of the aperture stop (i.e. diaphragm) in front of the optical system is also contemplated. However, it may require that a cover glass be placed in front of the aperture stop to keep dust and dirt out. Therefore, by placing the aperture stop at the rear of the optical system (i.e. towards the image plane), eliminates the need for the cover glass.

This design is extremely compact as can be determined by a vertex-to-film plane distance which is short—i.e. only 27.26 mm when the focal length is 25.6 mm. The size of the front clear aperture is 9.9 mm and the system $f$/No. is 4.5. In designing the lens system for the compact camera, it has been determined that the focal length range is preferably between 20 and 30 mm in order to make the lens system more compact and that the focal range should preferably be between 22 and 28 mm and more preferably between 25 and 27 mm. We determined that a short focal length (i.e. $f$<20 mm) tends to require more elements because the field angle has to increase to cover the same image size, and this causes the aberration correction to become increasingly difficult. In particular, such aberrations as distortion and astigmatism become predominant. On the other hand, a lens system having the same $f$/No., but a longer focal length (i.e. $f$>30) will tend to make all elements larger and the front vertex to image plane longer thus producing a more bulky lens. The advantages provided by edge contact would also be jeopardized. In addition, the back focal length BF, (back focal length is the distance measured from the rear vertex of the rear surface of the last lens element to the image plane) needs to be between 5 mm and 24.85 mm. Placing a lens element closer than approximately 5 mm to the image plane when stopping the lens down to $f$/16 or greater results in small artifacts on the lens surface near the image plane to be visible at the image plane. Thus, it is found that a lens system satisfying the following parameters or requirements is particularly suited for use in very compact cameras:

(1) $20 \leq f \leq 30$, (2) $5 \leq BF \leq 24.85$ and (3) $2 \leq f/\text{No.}|_{min} \leq 5.6$, where $f$ is the focal length of the lens system, BF is the back focus of the lens system. $f/\text{No.}|_{min.}$ is the $f$/No. that the system is intended to perform at without being stepped down. Alternatively, in the lens system which can be used in lower cost cameras, the $f$/No. may be slower, thus, the third requirement described can be altered to $3<f/\text{No.}<16$ where $f$/No. is the lens system's $f$/No.

Finally, it is preferred that high index materials be used for outer elements in a design of this lens system. Some of the reasons are reduced field curvature and spherical aberration correction. In addition, the edge contact properties are closely related to a best choice of high index glass. (This is all related to $f$/No., field coverage and focal length range requirements discussed above.) If low indices are used, the powers and radii of the outer elements are redefined in such a way that it becomes more difficult to achieve edge conditions.

Constructional values for the first preferred embodiment of the invention is shown in Table 1 below, in which the lens elements are numbered from front to rear, N is the index of refraction for the d line of the spectrum, V is the Abbe number, R is the radius of curvature of the lens surface, T is the axial thickness of the lens element, and d is the axial separation between the lens elements.

TABLE 1 f = 25.56; BF = 20.31; semifield angle = 33.58°; f/No. = 3.5.

| Lens Element | Surface | Clear Aper. | Radius | Thickness | Material $N_d$ | V |
|---|---|---|---|---|---|---|
| L1' | S1 | 10.53 | $R_1 = 8.02940$ | $T_1 = 2.500$ | 1.734 | 51.8 |
|  | S2 | 8.80 | $R_2 = 15.8029$ | $d_1 = 1.102$ |  |  |
| L2' | S3 | 8.23 | $R_3 = -31.7598$ | $T_2 = 0.668$ | 1.689 | 31.2 |
|  | S4 | 6.76 | $R_4 = 8.18380$ | $d_2 = 0.577$ |  |  |
| L3a' | S5 | 6.60 | $R_5 = 15.8680$ | $T_3 = 2.565$ | 1.788 | 47.5 |
| L3b' | S6;S7 | 6.11 | $R_6;R_7 = -9.92860$ | $T_4 = 0.850$ | 1.569 | 56.1 |
|  | S8 | 5.91 | $R_8 = -31.4600$ | $d_3 = 1.000$ |  |  |
|  |  | 6.14[1] | DIAPHRAGM[1] |  |  |  |

[1]THE DIAPHRAM ACTS AS A BAFFLE WHEN THE LENS OPERATES AT f/3.5 AND THE CLEAR APERTURE OF SURFACE S7 BECOMES THE STOP.

FIGS. 3 and 4 illustrate that the lens elements L1', L2', L3a' and L3b' of lens system 100 are freely placed in the lens barrel 4. Their optical axes are aligned without a need to cement these elements to each other. All of the lens components are pressed against the lens barrel inner walls. In this embodiment, the three lens components are mounted in the cylindrical recess surface of the lens barrel and have outer annual barrel contacting surfaces 1b, 2b and 3b respectively. The lens elements have just enough clearance to move within the barrel so as to be positioned within the barrel. Finally, the lens system 100 is securely retained within the lens barrel 4 by a pressing member 10' for pressing the first lens element L1' against the second lens element L2', and by a pressing member 20' for pressing the third lens element L3' against the second lens element L2'.

In the photographic lens devices, the lens components can be readily slipped inside the lens barrel 4. Once the edge contact is established between the lens elements, the lens elements align themselves with a high degree of accuracy and are then retained in the barrel in that alignment by pressure means such as the pressing members 10 and 20 or the barrel surfaces 30 and 40 which are adjacent to lens elements 1 and 3 respectively.

The lens system assembly is done in the following fashion. At first, the rear component is dropped into the lens barrel where it is retained by pressing member 20 or 40 and the barrel walls. The second component is dropped in second. It contacts physically with the rear lens component establishing the edge contact. Once the edge contact is established, the airspace $d_2$ between the second and the rear lens component is automatically set with the required precision without any further involvement on the part of the assembly personnel. Lastly, the front component corresponding to the lens element L1' is dropped into the lens barrel. Once the edge contact between the front component and the second component is established, the distance between these components is accurately set. Finally, with all lens components nested against each other in a barrel, pressure means is applied to the front lens element to permanently keep the lens system elements in an aligned relationship with each other and to prevent lens elements from movement. This may be done by use of a pressure member 10 (FIG. 3), or alternatively by use of a heat seal retainer 30 (FIG. 4). The heat seal retainer 30 may be formed (FIG. 11) by applying sufficient sonic energy to create heat which softens a plastic lip which forms a ring 32 and extends round the edge of a lens element. A specially made metal tool then presses the ring over and down upon the upper surface of the lens element, permanently retaining it in the barrel.

As specified above, the airspaces between the lens elements are arranged so that there exists an edge contact between the lens elements at Δ equal to about 2 mm, or Δ less than 2 mm beyond the clear aperture CA. This insures that the lens elements can be placed next to each other in glass-to-glass (or lens element-to-lens element) contact thus eliminating the costly need for superfluous spacers while having a compact lens system which can be used in a compact photographic camera. When two lens element are edge contacted to eliminate the need for a spacer, it is advantageous to have both elements have a finished diameter that extends beyond the edge contact point and then precision bevel one of the elements (usually the element with the concave surface). The bevel is placed at the precise aperture of the lens so that its sag 5 (FIG. 6) when edge contacted will accurately define the desired airspace di between the two elements (FIG. 5). In addition, manufacturing the precision bevel in this manner reduces the amount of edge chips and hence reduces the effects of unwanted stray light.

This embodiment also uses the unique method of utilizing the rear surface of the rear-most lens to act as the stop when the lens system is operating in wide open or fast mode (i.e. at a low $f$/No.) and enabling the "true" diaphragm to act as a baffle to control the upper rays at the $f$/3.5 opening (see FIG. 3 and Table 1). For $f$/No.'s slower than $f$/3.5, the diaphragm's aperture is reduced and acts as the true stop.

Furthermore, by placing a limiting clear aperture at surface S5 controls upper rays at the mid obliquities thus improving their image quality.

Figure 7:
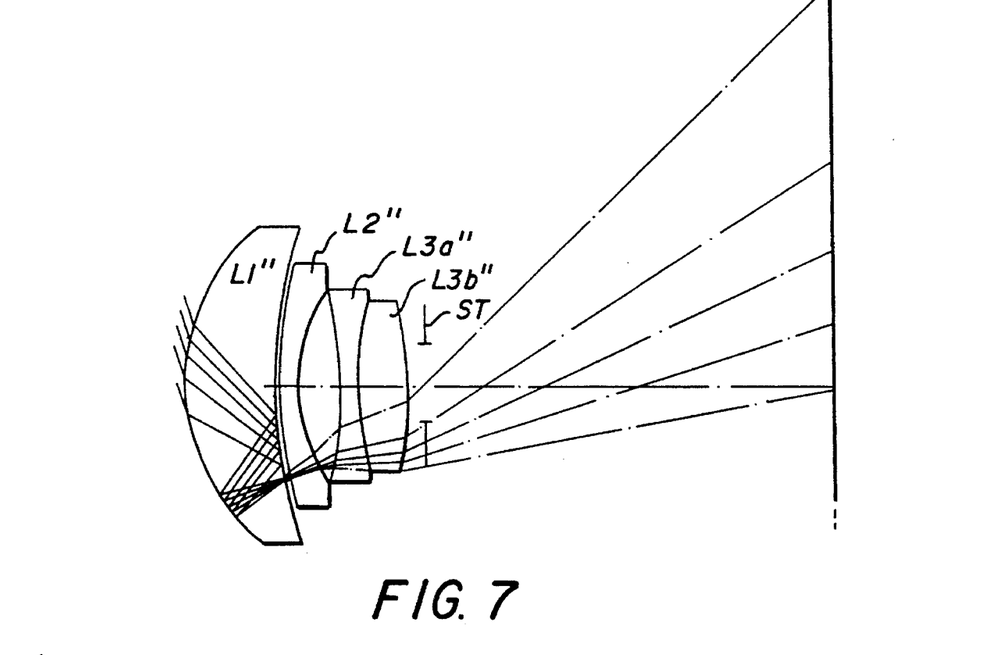
FIG. 7 illustrates how rays of stray light propagate in an optical system.

An important consideration is the reduction of light coming from overhead and through multiple reflections eventually exposing the film. This condition is illustrated in FIG. 7. FIG. 7 shows that a double reflection condition for a light source at 72 degrees azimuth angle allowing bundles of light striking high in the aperture to easily bounce twice within the front lens and then make it through a lens system to the image plane, resulting in an unacceptable picture quality.

Therefore, the second component corresponding to lens element L2' is designed so as to minimize the upward slope of the stray rays after the reflection from the front surface of the front lens element L1 (i.e. the 2nd reflection within the first lens element). This change results in fewer stray light rays passing through the aperture stop opening. The diaphragm walls of the aperture stop will thus block the rest of the unwanted or stray light. This shaping of the second component also permits the shape of the first lens component that minimizes the angle of incidence of the rays for controlling internal reflections, with the result that the unwanted high incident overhead light (ray C in FIG. 8) that enters the front surface of S1 above the optical axis does not propagate towards the opening in the diaphragm but is bent downward and instead will be limited by the diaphragm wall. Thus, there is minimized total internal reflections that will send light rays towards the image plane. The lens system 100 of the preferred embodiment illustrates the result of designing for stray light minimization. The stray bundles of light do not make it through the lens until they strike the front surface below the axis resulting in near grazing incidence and even then the bundle is vignetted by the time it reaches the image.

Figure 8:
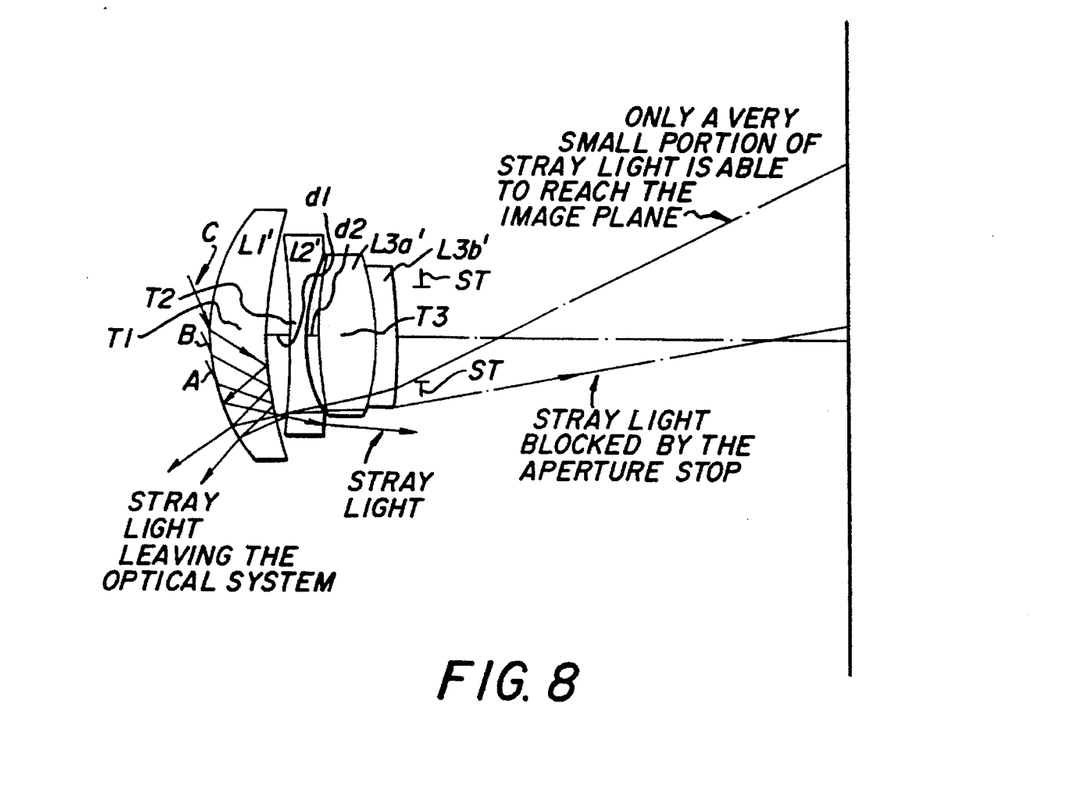
FIG. 8 illustrates the function of the lens system in eliminating the light flare or stray light problem.
Figure 9A:
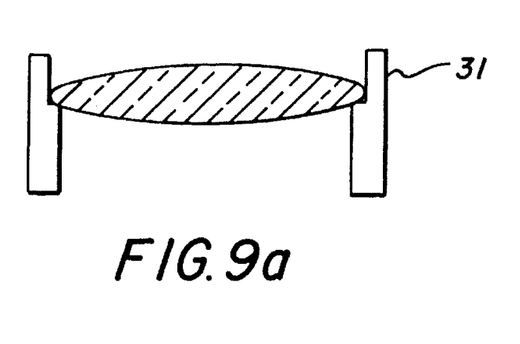
FIG. 9a–b illustrate the formation of a heat seal retainer such as the one illustrated in FIG. 4.
Figure 9B:
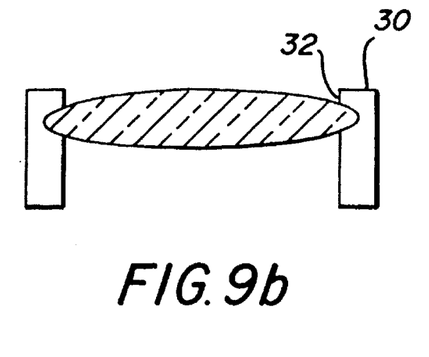

Thus, is re-configured to eliminate double and triple reflections that results in undesirable light flare at the image plane from a bright overhead object, such as the sun, when it is subtending an angle from 55 to 75 degrees. When the sun is lower in the horizon (i.e. when its azimuth angle is less than 55 degrees) it would be seen in the viewfinder and the camera sensor would be eliminated as a potential camera shot. If the sun is higher than 75 degrees, then them is no chance of double reflection due to high grazing angles of the light. To summarize, the first and the second lens components have sufficient bendings to control the double or triple reflections of the stray light propagating within the optical system. The bending of the unwanted light rays so they do not propagate towards the opening in the diaphragm and on to the image (or film) plane improves the resulting image or picture quality. FIG. 8 shows the stray ray bundles and illustrate how this effect has been controlled.

Finally, the lens systems described herein are particularly advantageous when used in the focal length range 24 mm to 27 mm and for covering half fields of at least 34 degrees.

The invention has been described in detail with particular reference to preferred embodiments thereof, but it will be understood that variations and modifications can be effected within the spirit and scope of the invention.

We claim:

1. A lens system comprising a plurality of lens components having a plurality of lens surfaces and arranged in order from a front, object side to a rear, image side:

a first positive power meniscus lens component having a lens surface convex to the object side;

a second bi-concave lens component;

a third bi-convex lens component; and a diaphragm, one of said plurality of lens surfaces and said diaphragm defining two aperture stop locations, said diaphragm being adjustable between a wide-open condition and a small open condition, said diaphragm being located to operate as an aperture stop when in the small open condition, said lens components having a lens surface that is positioned and sized to operate as an aperture stop when said diaphragm is in its wide-open condition while said diaphragm does not function as an aperture stop but operates as a baffle to eliminate propagation of unwanted light towards the image plane, wherein the lens system fulfills the following conditions:

$$N_3 - N_1 \leq 0.1$$

$$\frac{N_1}{N_2} \geq 0.9$$

$$0.25f < \Sigma d < 0.35f$$

where:

$f$ is the composite focal length of the lens system;

$\Sigma d$ is the distance from the vertex of the foremost lens surface to the vertex of the rearmost lens surface of the lens system;

$N_1$ represents the refractive index of a positive first lens element forming the first lens component;

$N_2$ represents the refractive index of a negative second lens element forming the second lens component; and $N_3$ represents the refractive index of a positive third lens element forming a part of the third lens component.

2. A lens system according to claim 1, wherein said diaphragm is arranged behind said third lens component.

3. A lens system comprising a plurality of lens components having a plurality of lens surfaces and arranged in order from a front, object side:

a first positive power meniscus lens component having a surface convex to the object side;

a second bi-concave lens component;

a third bi-convex lens component, said plurality of lens components having radii of curvature, thicknesses and airspaces to enable the lens to cover at least 55 degree field of view; and a diaphragm, one of said plurality of lens surfaces and said diaphragm defining two alternative aperture stop locations, said diaphragm being adjustable between a wide-open and slower F-number mode by forming a wide opening and a smaller opening, said diaphragm being located to provide a true aperture stop when in the slower F-number mode, said lens components having a surface that is positioned and sized to define the aperture stop when said diaphragm is in a wide open mode while said diaphragm does not function as an aperture stop but operates as a baffle to eliminate propagation of unwanted light towards the image plane.

4. A lens system according to claim 3, wherein said diaphragm is arranged behind said third lens component.

5. A lens system according to claim 3, wherein said lens surface acting as a stop when the lens system is operating in a wide open mode is a rear-most lens surface of the optical system.

6. A lens system according to claim 4, wherein said lens surface acting as a stop when the lens system is operating in a wide open mode is a rear-most lens surface of the optical system.

7. A lens system as claimed in claim 2, wherein:

$$T_1 \geq 2 d_1$$

and $$T_3 \geq 3 d_2$$

where:

$d_1$ is the airspace between the first and the second lens elements;

$d_2$ is the airspace between the second and the third lens elements;

$T_1$ is the thickness of the first lens element; and $T_3$ is the thickness of the third lens element.

8. A lens system according to claim 2 wherein:

$$0.275 \leq \frac{|f_2|}{f} < 0.375 \quad 1.5 \leq \frac{f_1}{f_3}$$

where:

$f_1$ represents the focal length of the first lens component;

$f_2$ represents the focal length of the second lens component;

$f_3$ represents the focal length of the third lens component; and $f$ is the focal length of the lens system.

9. A lens system according to claim 1, wherein said lens surface acting as an aperture stop when the lens system is operating in a wide open mode is the rear-most lens surface.

10. A lens system according to claim 2, wherein said lens surface acting as an aperture stop when the lens system is operating in a wide open mode is the rear-most lens surface.

11. A lens system according to claim 1, wherein said lens components have sufficient surface radii of curvatures to provide the proper bending of said first and said second lens components, so that an unwanted high incident overhead light that enters the front-most lens surface of the lens system does not propagate towards the opening of the diaphragm and does not reach the image plane or film.

12. A lens system according to claim 2, wherein said lens components have sufficient surface radii of curvatures to provide the proper bending of said first and said second lens components, so that an unwanted high incident overhead light that enters the front-most lens surface of the lens system does not propagate towards the opening of the diaphragm and does not reach the image plane or film.

13. A lens system comprising:

a positive power first outer lens component;

a middle negative power lens component airspaced from said positive first lens component;

a positive power second outer lens component, said second outer lens component being airspaced from said second negative lens component;

a diaphragm, said diaphragm being located on an outer side of one of said outer lens components, said diaphragm and one of said outer lens components defining two alternative aperture stop locations, said diaphragm being adjustable between a wide-open condition and a small open condition, said diaphragm cooperating with said outer lens components to operate as a lens baffle to eliminate unwanted light when said diaphragm is in a wide-open condition and while a lens surface operates as an aperture stop, and said diaphragm operates as an aperture stop when the lens system is operated at slower F-numbers; and wherein all of the airspaces between said lens components are so arranged that there exists an edge contact between all of the adjacent lens components at less than 3 mm beyond clear aperture diameter.

14. A lens system according to claim 13, wherein said lens surface operating as a stop is a rear-most lens surface.

15. A lens system according to claim 13, wherein said edge contact is at less than 2 mm beyond clear aperture.

16. A lens system according to claim 15, wherein said lens surface operating as a stop when the lens system is operating in a wide open mode is a rear-most lens surface.

17. A lens system according to claim 15, wherein:

$$0.3 \leq \frac{|f_2|}{f} \leq 0.36,$$

where:

$f_2$ is the focal length of said negative middle lens component; and $f$ is the focal length of the lens system.

18. A compact lens system for use in a compact photographic camera comprising in order from front to rear:

a plurality of optical elements having a plurality of lens surfaces, said plurality of optical elements spaced in a close proximity to one another, said plurality of lens elements having sufficient powers and spacings to enable said lens system to cover a field of view of at least 55 degrees, said plurality of lens elements including at least one positive power lens element and one negative power lens element wherein an airspace between said positive power lens element and said negative power lens element is smaller than the thickness of said positive lens element;

a diaphragm, adjustable between a wide-open and slower F-number condition by forming a wide open and smaller opening, said lens system having two alternative aperture stop positions provided by one of said lens surfaces and by said diaphragm, said diaphragm being located to operate as an aperture stop when in the slower F-number condition, said lens elements having a surface that is positioned and sized to define the aperture stop when said diaphragm is wide open while said diaphragm does not function as an aperture stop but operates as a baffle to eliminate propagation of unwanted light towards the image plane; and the lens system being suited for use in said compact camera by satisfying the following parameters:

$20 \leq f \leq 30$ $5 \leq BF \leq 24.85$ $3 \leq f/No. \leq 16$, where $f$ is the focal length of the lens system, BF is the back focus of the lens system and $f/No.$ is the F-number of the lens system and all distances are in millimeters.

19. A compact lens system according to claim 18, wherein said plurality of lens elements are only three lens components arranged in order from an object side, a first positive power lens component, a second negative power lens component, and a third positive power lens component.

20. A compact lens system according to claim 7, wherein said lens surface acting as a stop when the lens system is operating in a wide angle mode is a rear-most lens surface.

21. A compact lens system according to claim 18, wherein said lens surface acting as a stop when the lens surface is operating in a wide angle mode is a rear-most surface of the rear-most lens component.

22. A compact lens system according to claim 19, wherein said first and second lens components have sufficient bendings to control double and triple reflections of unwanted light propagating within the lens system, thereby improving image quality of said lens system.

23. A compact lens system for use as a taking lens in a compact camera comprising no more than four lens elements centered on an optical axis and having a plurality of lens surfaces and a diaphragm, one of said lens surfaces and said diaphragm defining two aperture stop positions;

said lens elements arranged in lens components so that there is edge contact among all of the adjacent lens components and the adjacent lens components having cooperating edge surfaces self-center with respect to each other and the optical axis; and said diaphragm being arranged behind the lens element facing an image plane, said diaphragm being adjustable between a wide-open and slower F-number condition by forming a wide opening and smaller opening, said diaphragm being located to provide a true aperture stop when in the slower F-number condition, said lens system being designed so that one of said plurality of lens surfaces is positioned and sized to define the aperture stop when said diaphragm is in a wide-open condition while said diaphragm does not function as an aperture stop but operates as a baffle to eliminate propagation of unwanted light towards the image plane.

24. A compact lens system according to claim 23, wherein first and second lens components of said lens system have sufficient bendings to control double and triple reflections of a stray light propagating within the lens system, thereby improving an image quality of the lens system.

25. A compact lens system according to claim 23 comprising only three lens components arranged in order from an object side: a front positive power lens component, a negative power lens component and a rear positive power lens component.

26. A compact lens system according to claim 25 having the following parameters:

$22 \leq f \leq 28$ $5 \leq BF \leq 23$ $3 \leq f/No. \leq 16$, where $f$ is the focal length of the lens system, BF is the back focus of the lens system and $f/No.$ is the F-number of the lens system.

27. A compact lens system according to claim 25, wherein the rear lens component is a cemented doublet.

28. A compact lens system according to claim 24 comprising only three lens components arranged in order from an object side: a front positive power lens component, a negative power lens component and a rear positive power lens component.

29. A compact lens system according to claim 26, wherein there is an edge contact between all of lens components at less than 3 mm beyond clear aperture, and $$0.275 \leq \frac{|f_2|}{f} \leq 0.375,$$

where:

$f_2$ is the focal length of said negative middle lens component; and $f$ is the focal length of the lens system.

30. A compact lens system according to claim 25, wherein:

said front positive power lens component is a positive meniscus lens component having a surface convex to the object side;

said negative power lens component is a bi-concave lens element; and said rear positive power lens component is a bi-convex lens component.

31. A compact lens system according to claim 30, wherein said rear positive lens component is a cemented doublet comprising one positive lens element and one negative lens element.

32. A compact lens system comprising a plurality of lens components having a plurality of lens surfaces and arranged in order from an object side:

a first positive power meniscus lens component having a foremost lens surface convex to the object side;

a second bi-concave lens component;

a third bi-convex lens component; and a diaphragm, one of said plurality of lens surfaces and said diaphragm defining two aperture stop locations, said diaphragm being adjustable between a wide-open condition and a small open condition, said diaphragm being located to operate as an aperture stop when in the small open condition, said lens components having a lens surface that is positioned and sized to operate as an aperture stop when said diaphragm is in its wide-open condition while said diaphragm does not function as an aperture stop but operates as a baffle to eliminate propagation of unwanted light towards the image plane, wherein the lens system fulfills the following conditions:

$20 \leq f \leq 30$ $5 \leq BF \leq 24.85$ $3 \leq f/No. \leq 16$, where $f$ is the focal length of the lens system, BF is the back focus of the lens system and $f$/No. is the F-number of the lens system; and said lens components having respective radii of curvature to control the propagation of unwanted overhead light so that said unwanted light rays propagating through the lens system are bent away from propagating toward the opening of the diaphragm.

33. A compact lens system according to claim 32, wherein the lens components are arranged so that there is an edge contact among all of the adjacent lens components.

34. A compact lens system according to claim 33, wherein said edge contact is at more than 0.0 mm to sufficiently minimize scattered light and at less than 3 mm beyond the clear aperture of each one of said lens components.

35. A compact lens system according to claim 34, wherein said edge contact exists at more than 0.0 mm to sufficiently minimize scattered light and at less than 2 mm beyond the clear aperture of each one of said lens components.

36. A photographic device comprising:

(a) a lens system including in order:

a first lens component having a first and a second lens surface, said second lens surface having a second surface clear aperture;

a second lens component having a first surface and a second surface, said first surface of the second lens component having a first surface clear aperture, said second surface of said second lens component having a second surface clear aperture, said first lens surface of said second lens component being positioned adjacent to said second lens surface of said first lens component, said second lens surface of said first lens component and said first lens surface of said second lens component pressing against each other and forming an edge contact at less than 2 mm beyond the clear apertures of said lens surfaces;

a third lens component having a first surface and a second surface, said first surface of the third lens component having a first surface clear aperture, said second surface of said third lens component having a second surface clear aperture, said first lens surface of said third lens component being positioned adjacent to said second lens surface of said second lens component, said respective adjacent surfaces pressing against each other and forming an edge contact at more than 0.0 mm to sufficiently minimize scattered light and at less than 2 mm beyond the clear apertures of said second lens surface of said second lens component and said first surface of said third lens component, said first, second and third lens components having surface radii of curvatures to provide sufficient bending to control propagation of stray light towards the diaphragm opening; and (b) a lens barrel for containing said lens components in an alignment with respect to each other, said barrel containing:

(a) annularly-shaped surfaces for engaging each of the lens components;

(b) a first pressure means for engaging the first surface of the first lens component and for exerting pressure thereon; and (c) a second pressure means for engaging the rear surface of a rear lens element and for exerting pressure thereon.

37. A photographic device according to claim 36, wherein said first lens component is a meniscus lens element having its convex surface oriented towards the object space, said second lens component is a bi-concave lens element, and said third lens component is a cemented doublet lens component.

38. A lens system according to claim 1, wherein the lens components or are beveled to control airspaces between the lens components and to reduce effects of unwanted stray light.

39. A lens system according to claim 2, wherein the lens components or are beveled to control airspaces between the lens components and to reduce effects of unwanted stray light.

40. A lens system according to claim 3, wherein the lens components are beveled to control airspaces between the lens components and to reduce effects of unwanted stray light.

41. A lens system according to claim 11, wherein the lens components are beveled to control airspaces between the lens components and to reduce effects of unwanted stray light.

42. A lens system according to claim 12, wherein the lens components are beveled to control airspaces between the lens components and to reduce effects of unwanted stray light.

43. A lens system according to claim 18, wherein the lens components are beveled to control airspaces between the lens components and to reduce effects of unwanted stray light.

44. A lens system according to claim 32, wherein the lens components are beveled to control airspaces between the lens components and to reduce effects of unwanted stray light.

45. A lens system according to claim 34, wherein the lens components are beveled to control airspaces between the lens components and to reduce effects of unwanted stray light.

\* \* \* \* \*